US012698214B2

(12) United States Patent
Li et al.

(10) Patent No.: US 12,698,214 B2
(45) Date of Patent: Aug. 4, 2026

(54) PREPARATION METHOD FOR NANOSIZED LITHIUM COBALT OXIDE CATHODE MATERIAL AND APPLICATION THEREOF

(71) Applicants: GUANGDONG BRUNP RECYCLING TECHNOLOGY CO., LTD., Foshan (CN); HUNAN BRUNP RECYCLING TECHNOLOGY CO., LTD., Changsha (CN); HUNAN BRUNP EV RECYCLING CO., LTD., Changsha (CN)

(72) Inventors: Weiquan Li, Foshan (CN); Genghao Liu, Foshan (CN); Dingshan Ruan, Foshan (CN); Changdong Li, Foshan (CN); Hongjia Lin, Foshan (CN)

(73) Assignees: GUANGDONG BRUNP RECYCLING TECHNOLOGY CO., LTD., Foshan (CN); HUNAN BRUNP RECYCLING TECHNOLOGY CO., LTD., Changsha (CN); HUNAN BRUNP EV RECYCLING CO., LTD., Changsha (CN)

( * ) Notice: Subject to any disclaimer, the term of this patent is extended or adjusted under 35 U.S.C. 154(b) by 529 days.

(21) Appl. No.: 18/215,168

(22) Filed: Jun. 27, 2023

(65) Prior Publication Data

US 2023/0331584 A1 Oct. 19, 2023

Related U.S. Application Data

(63) Continuation of application No. PCT/CN2021/142455, filed on Dec. 29, 2021.

(30) Foreign Application Priority Data

Jan. 12, 2021 (CN) .......................... 202110037138.9

(51) Int. Cl.
*C01G 51/42* (2025.01)
*H01M 4/02* (2006.01)
(Continued)

(52) U.S. Cl.
CPC ............ *C01G 51/42* (2013.01); *H01M 4/525* (2013.01); *H01M 10/0525* (2013.01);
(Continued)

(58) Field of Classification Search
CPC ........ C01G 51/42; C01G 51/06; C01G 51/00; H01M 4/525; H01M 10/0525;
(Continued)

(56) References Cited

FOREIGN PATENT DOCUMENTS

| CN | 1276345 | A | | 12/2000 | |
|----|---------|---|---|---------|---|
| CN | 1344682 | A | * | 4/2002 | |
| CN | 1472829 | A | * | 2/2004 | .......... H01M 4/1391 |

OTHER PUBLICATIONS

International Search Report of PCT Patent Application No. PCT/CN2021/142455 issued on Mar. 23, 2022.
(Continued)

*Primary Examiner* — Anthony J Zimmer
*Assistant Examiner* — Syed T Iqbal
(74) *Attorney, Agent, or Firm* — Westbridge IP LLC

(57) ABSTRACT

The invention belongs to the technical field of lithium ion battery cathode materials, and discloses a preparation method and application of nanosized lithium cobalt oxide cathode materials, comprising the following steps: mixing the carbonate solution with a dispersant, adding a cobalt salt solution to react, then aging, filtering, drying the filter residue to obtain a nano-$CoCO_3$ powder, and then calcinating it to obtain a $Co_3O_4$ precursor; mixing the $Co_3O_4$ precursor with a lithium salt, and then sintering, cooling, pulverizing and sieving to obtain the nanosized lithium cobalt oxide cathode material. The main advantages of the
(Continued)

present invention are that the nano-CoCO$_3$ synthesis process is simple and easy to control, the process is short, no special temperature control is required, the pH value and other conditions are not required to be precisely controlled during the reaction process, and it is suitable for large-scale industrial production.

7 Claims, 2 Drawing Sheets

(51) Int. Cl.
　　*H01M 4/525*　　　　(2010.01)
　　*H01M 10/0525*　　　(2010.01)
(52) U.S. Cl.
　　CPC ...... *C01P 2004/03* (2013.01); *C01P 2004/64* (2013.01); *C01P 2006/40* (2013.01); *H01M 2004/021* (2013.01); *H01M 2004/028* (2013.01)

(58) Field of Classification Search
　　CPC ..... H01M 2004/021; H01M 2004/028; H01M 4/133; H01M 4/1391; C01P 2004/03; C01P 2004/64; C01P 2006/40; C01P 2004/51; C01P 2004/62; Y02E 60/10
　　See application file for complete search history.

(56) References Cited

OTHER PUBLICATIONS

Ya-Dong Li et al., Fabrication of Co3O4 Ultrafines by a Liquid-control-precipitation Method, Chemical Journal of Chinese Universities, Apr. 30, 1999, pp. 519-522, vol. 20, No. 4.

* cited by examiner

1

PREPARATION METHOD FOR NANOSIZED LITHIUM COBALT OXIDE CATHODE MATERIAL AND APPLICATION THEREOF

CROSS-REFERENCE TO RELATED APPLICATIONS

The present application is a continuation application of PCT application No. PCT/CN2021/142455 filed on Dec. 29, 2021, which claims the benefit of Chinese Patent Application No. 202110037138.9 filed on Jan. 12, 2021. The contents of all of the aforementioned applications are incorporated by reference herein in their entirety.

TECHNICAL FIELD

The invention belongs to the technical field of lithium ion battery cathode materials, and specifically relates to a preparation method for a nanosized lithium cobalt oxide cathode material and application thereof.

BACKGROUND

The demand for lithium-ion battery cathode materials has increased greatly with the rapid growth of the new energy automobile industry, as well as the continuous expansion of the traditional energy storage field and the 3C power supply market in recent years. With the rapid development of the market, the performance requirements of the cathode material, especially the performance of fast charging and discharging, are getting higher and higher. As we all know, an important method to improve the rapid charge-discharge capability (that is, rate performance) of the cathode material is to minimize or even nanometer the particle size of the electrode material. Because the particle size affects the distance of Li ion transmission, it also affects the contact area between the active material and the electrolyte. The nanometer electrode material is conducive to the rapid transmission of Li ions inside the material, and is also conducive to expanding the contact area between the material and the electrolyte, which is of great help to improving the rate performance of the electrode.

At present, most of the commercial lithium cobalt oxide cathode materials are micron-sized spherical particles. The synthesis of nano-scale lithium cobalt oxide is mostly still in the laboratory research stage, and there are problems of complicated operating processes, difficult control of reaction conditions, and difficulty to amplify in actual production.

SUMMARY OF THE INVENTION

The present invention aims to solve at least one of the technical problems existing in the above-mentioned prior art. For this reason, the present invention proposes a preparation method and application of a nanosized lithium cobalt oxide cathode material, and the product is easy to prepare and suitable for large-scale mass production.

A preparation method of a nanosized lithium cobalt oxide cathode material comprises the following steps:
  (1) Mixing a carbonate solution with a dispersant, adding a cobalt salt solution to perform a reaction, then aging, filtering to obtain a filter residue, drying the filter residue to obtain a nano-$CoCO_3$ powder, and then calcinating it to obtain a $Co_3O_4$ precursor;
  (2) Mixing the $Co_3O_4$ precursor with a lithium salt, and then subjecting a resulting mixture to calcinating, cooling, pulverizing and sieving to obtain the nanosized lithium cobalt oxide cathode material;

Wherein, the total molar amount of $Co^{2+}$ in the cobalt salt solution is less than $\frac{1}{5}$ of the total molar amount of carbonate in the carbonate solution. The carbonate solution is used as a precipitating agent, and the size of the $CoCO_3$ particles is related to the excess ratio of the precipitating agent. Only the $CoCO_3$ particles obtained from a 5-fold excess of the precipitating agent can reach the nanometer size.

The nanosized lithium cobalt oxide cathode material has an average particle size of 500 to 800 nm, and a microscopic morphology of granular or short rod-shaped uniformly dispersed particles.

The average particle size of the nano-$CoCO_3$ powder is 100 to 1000 nm.

Preferably, the cobalt salt solution in step (1) is prepared by dissolving a cobalt salt in water, and the cobalt salt is one or more selected from the group consisting of cobalt sulfate, cobalt nitrate and cobalt chloride; the concentration of the cobalt salt solution is 0.1 to 2.0 mol/L.

Preferably, the carbonate solution in step (1) is prepared by dissolving a carbonate in water, and the carbonate is one or more selected from the group consisting of sodium carbonate, sodium bicarbonate, ammonium carbonate, ammonium bicarbonate, potassium carbonate and potassium bicarbonate; the concentration of the carbonate solution is 1.0 to 2.0 mol/L.

Preferably, in step (1), the dispersant is one or more selected from the group consisting of methanol, ethanol, ethylene glycol, propanol and glycerol.

Preferably, in step (1), the total moles of $Co^{2+}$ in the cobalt salt solution cannot exceed $\frac{1}{10}$ of the total moles of carbonate in the carbonate solution. The higher the excess of carbonate solution, the more probably it will inhibit the growth of $CoCO_3$ particles.

Preferably, in step (1), the reaction is carried out at a temperature of 0 to 70° C., and more preferably, a temperature of 20 to 30° C.

Preferably, in step (1), the calcinating is carried out at a temperature of 300 to 800° C., and more preferably, 400 to 600° C.

Preferably, in step (1), the aging time is 2 to 3 hours.

Preferably, in step (2), the lithium salt is one or more selected from the group consisting of lithium carbonate, lithium hydroxide, lithium nitrate, lithium sulfate and lithium oxalate.

Preferably, in step (2), the molar ratio of the cobalt element in the $Co_3O_4$ precursor to the lithium element in the lithium salt is 1: (1.0-1.2).

Preferably, in step (2), the calcinating is carried out at a temperature of 900 to 1200° C. for 6-18 h.

The present invention also provides the application of the above-mentioned preparation method in the preparation of lithium ion batteries.

Beneficial Effects

1. The main advantages of the present invention are that the nano-$CoCO_3$ synthesis process is simple and easy to control, the process is short, no special temperature control is required, the pH value and other conditions are not required to be precisely controlled during the reaction process, and it is suitable for large-scale industrial production.
  2. The synthesized nano-$CoCO_3$ particles have uniform particle size, good dispersibility, no agglomeration, and the material is easy to process and use. The finally obtained nanosized lithium cobalt oxide has both nano characteristics and lithium cobalt oxide cathode material characteristics, with an average particle size of 100 to 1000 nm, has a short Li ion transmission path and a large contact area with an electrolyte, so that the electrode can quickly and massively transport ions, with high discharge capacity and good rate performance. The discharge specific capacity under 5C rate can reach 160 mAh/g, suitable for fast charging or high-power lithium-ion batteries.

BRIEF DESCRIPTION OF DRAWINGS

The present invention will be further described below in conjunction with the accompanying drawings and examples, wherein.

DETAILED DESCRIPTION OF THE ILLUSTRATED EXAMPLES

Figure 1:
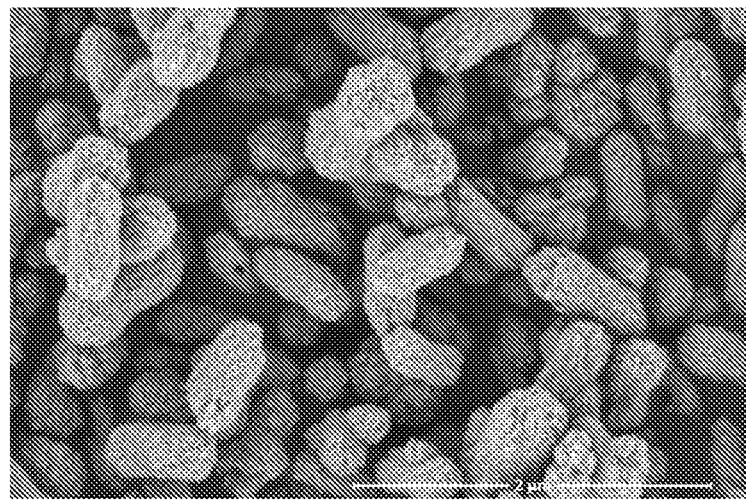
FIG. 1 is an SEM image of the nano-$CoCO_3$ powder in Example 1 of the present invention.

Hereinafter, the concept of the present invention and the technical effects produced by it will be described clearly and completely in conjunction with the examples, so as to fully understand the purpose, features and effects of the present invention. Obviously, the described examples are only a part of the examples of the present invention, rather than all of them. Based on the examples of the present invention, other examples obtained by those skilled in the art without creative work belong to the scope of protection of the present invention.

Example 1

In this example, a nanosized lithium cobalt oxide cathode material was prepared, and the specific process was as follows:

(1) Dissolving cobalt sulfate in water to prepare a cobalt salt solution with a concentration of 0.75 mol/L, and dissolving ammonium bicarbonate in water to prepare a carbonate solution with a concentration of 1.65 mol/L;

(2) Injecting 400 L of carbonate solution into a 600 L volume reactor, adding 50 L of ethanol as a dispersant, starting the reactor, stirring the carbonate solution and the dispersant thoroughly, and keeping the temperature of the reactor at room temperature of 25° C. Injecting the cobalt salt solution into the reactor at a flow rate of 20 L/h until a total of 80 L of cobalt salt solution is injected in 4 hours. Keeping stirring, driving the materials into a centrifuge for dehydration and washing after they are aged in the reactor for 2 hours, then drying them to obtain a nano-$CoCO_3$ powder, and calcining the nano-$CoCO_3$ powder at 400° C. for 4 hours to obtain a nano-$Co_3O_4$ precursor;

(3) Weighing 1685 g of lithium carbonate and 3500 g of nano-$Co_3O_4$ precursor according to the cobalt-lithium molar ratio of 1:1.05, mixing the weighed lithium carbonate and nano-$Co_3O_4$ precursor evenly in the mixer, calcining the mixed materials in an air atmosphere at 1020° C. for 9 hours in a furnace, cooling naturally, pulverizing the product by airflow and sieving to obtain a nanosized lithium cobalt oxide cathode material.

Example 2

In this example, a nanosized lithium cobalt oxide cathode material was prepared, and the specific process was as follows:

(1) Dissolving cobalt dichloride in water to prepare a cobalt salt solution with a concentration of 0.8 mol/L, and dissolving sodium bicarbonate in water to prepare a carbonate solution with a concentration of 1.65 mol/L;

(2) Injecting 400 L of carbonate solution into a 600 L reactor, adding 60 L of ethylene glycol as a dispersant, starting the reactor, stirring the carbonate solution and the dispersant thoroughly, and keeping the temperature of the reactor at room temperature of 20° C. Injecting the cobalt salt solution into the reactor at a flow rate of 30 L/h until a total of 75 L of cobalt salt solution is injected in 2.5 hours. Keeping stirring, driving the materials into a centrifuge for dehydration and washing after they are aged in the reactor for 2 hours, then drying them to obtain a nano-$CoCO_3$ powder, and calcining the nano-$CoCO_3$ powder at 450° C. for 4 hours to obtain a nano-$Co_3O_4$ precursor;

(3) Weighing 1660 g of lithium hydroxide and 3000 g of nano-$Co_3O_4$ precursor according to the cobalt-lithium molar ratio of 1:1.06, mixing the weighed lithium carbonate and nano-$Co_3O_4$ precursor evenly in the mixer, calcining the mixed materials in an air atmosphere at 1010° C. for 10 hours in a furnace, cooling naturally, pulverizing the product by airflow and sieving to obtain a nanosized lithium cobalt oxide cathode material.

Example 3

In this example, a nanosized lithium cobalt oxide cathode material was prepared, and the specific process was as follows:

(1) Dissolving cobalt nitrate in water to prepare a cobalt salt solution with a concentration of 0.7 mol/L, and dissolving sodium carbonate in water to prepare a carbonate solution with a concentration of 1.5 mol/L;

(2) Injecting 350 L of carbonate solution into a 600 L reactor, adding 50 L of propyl alcohol as a dispersant, starting the reactor, stirring the carbonate solution and the dispersant thoroughly, and keeping the temperature of the reactor at room temperature of 20° C. Injecting the cobalt salt solution into the reactor at a flow rate of 20 L/h until a total of 60 L of cobalt salt solution is injected in 3 hours. Keeping stirring, driving the materials into a centrifuge for dehydration and washing after they are aged in the reactor for 2 hours, then drying them to obtain a nano-$CoCO_3$ powder, and calcining the nano-$CoCO_3$ powder at 430° C. for 5 hours to obtain a nano-$Co_3O_4$ precursor;

(3) Weighing 1912 g of lithium carbonate and 4000 g of nano-$Co_3O_4$ precursor according to the cobalt-lithium molar ratio of 1:1.04, mixing the weighed lithium carbonate and nano-$Co_3O_4$ precursor evenly in the mixer, calcining the mixed materials in an air atmosphere at 1050° C. for 8 hours in a furnace, cooling naturally, pulverizing the product by airflow and sieving to obtain a nanosized lithium cobalt oxide cathode material.

Comparative Example 1

In this comparative example, a lithium cobalt oxide cathode material was prepared, and the specific process was as follows:

(1) Dissolving cobalt sulfate in water to prepare a cobalt salt solution with a concentration of 1.5 mol/L, and dissolving sodium bicarbonate in water to prepare a carbonate solution with a concentration of 2 mol/L (2) Adding 400 L of water into a 600 L batch reactor, stirring and heating, keeping the temperature of the reactor at 50° C., and injecting the cobalt salt solution and carbonate solution at the same time. The materials in the reactor are drained of the clear liquid through the thickener. Cobalt carbonate particles continue to grow in the reactor. When the particle size reaches D50=6.0 um, the feeding liquid is stopped. Driving the materials in the reactor into a centrifuge for dehydration and washing, drying the $CoCO_3$ powder, and calcining it at 400° C. for 6 hours to obtain a $Co_3O_4$ precursor;

(3) Weighing 1930 g of lithium carbonate and 4000 g of nano-$Co_3O_4$ precursor according to the cobalt-lithium molar ratio of 1:1.05, mixing the weighed lithium carbonate and nano-$Co_3O_4$ precursor evenly in the mixer, calcining the mixed materials in an air atmosphere at 1070° C. for 10 hours in a furnace, cooling naturally, pulverizing the product by airflow to obtain a lithium cobalt oxide cathode material.

The main difference between Comparative Example 1 and the example is that the preparation process of the $CoCO_3$ powder in step (2) is different, and the particle size of the obtained particles is of a micron scale.

Comparative Example 2

In this comparative example, a lithium cobalt oxide cathode material was prepared, and the specific process was as follows:

(1) Dissolving cobalt chloride in water to prepare a cobalt salt solution with a concentration of 1.5 mol/L, and dissolving ammonium bicarbonate in water to prepare a carbonate solution with a concentration of 2 mol/L (2) Adding 400 L of water into a 600 L batch reactor, stirring and heating, keeping the temperature of the reactor at 45° C., and injecting the cobalt salt solution and carbonate solution at the same time. The materials in the reactor are drained of the clear liquid through the thickener. Cobalt carbonate particles continue to grow in the reactor. When the particle size reaches D50=6.0 um, the feeding liquid is stopped. Driving the materials in the reactor into a centrifuge for dehydration and washing, drying the $CoCO_3$ powder, and calcining it at 450° C. for 4.5 hours to obtain a $Co_3O_4$ precursor;

(3) Weighing 1936 g of lithium carbonate and 4000 g of nano-$Co_3O_4$ precursor according to the cobalt-lithium molar ratio of 1:1.05, mixing the weighed lithium carbonate and nano-$Co_3O_4$ precursor evenly in the mixer, calcining the mixed materials in an air atmosphere at 1080° C. for 9 hours in a furnace, cooling naturally, pulverizing the product by airflow to obtain a lithium cobalt oxide cathode material.

The main difference between Comparative Example 2 and the example is that the preparation process of the $CoCO_3$ powder in step (2) is different, and the particle size of the obtained particles is of a micron scale.

Comparative Example 3

In this comparative example, a kind of nano-$Co_3O_4$ was prepared by hydrothermal method, and the specific process was as follows:

Dissolving a certain amount of cobalt acetate in diethylene glycol (DEG), adding a certain amount of PVP surfactant, then adding a certain amount of urea, stirring to form a uniform solution, subjecting it to reacting in a sealed hydrothermal kettle under a high temperature and high pressure to obtain $CoCO_3$ nanoparticles with regular morphology. The $Co_3O_4$ nanoparticles with regular morphology were prepared by calcining the $CoCO_3$ particles at high temperature. Nano particles with different morphologies in peanut shape, capsule shape and square shape were obtained by controlling the amount of urea.

The main difference between Comparative Example 3 and the example lies in the preparation process of $CoCO_3$ nanoparticles. Even though nanoparticles can be obtained in the end, the operation process of this comparative example is delicate and complicated, and the control of reaction conditions is difficult, and it is difficult to scale up and apply in actual production.

Performance Testing

The following physical and chemical index tests were performed on the above Examples 1-3 and Comparative Examples 1-2:

The particle size was measured in accordance with the national standard GB/T 19077 "Laser Diffraction Method for Particle Size Analysis", using the Malvern 3000 laser particle size analyzer. The electric performance was tested as follows: the lithium cobalt oxide materials prepared in the examples and comparative examples were used as active materials, acetylene black was used as a conductive agent, PVDF was used as a binder. Weighing the active material, conductive agent and binder in a ratio of 92:4:4, adding a certain amount of organic solvent NMP, stirring and coating the mixture on aluminum foil to make a positive electrode sheet; adopting lithium metal sheet as negative electrode, and making CR2430 button battery in a glove box filled with argon. The electric performance was tested on a CT2001A LAND battery test system. Test conditions: 3.0-4.48V, current density 1C=180 mAh/g, test temperature: 25±1° C.

The test results are shown in Table 1:

| sample | D10 (µm) | D50 (µm) | D90 (µm) | 0.1 C/ 4.48 V (mAh/ g) | 1 C/ 4.48 V (mAh/ g) | 2 C/ 4.48 V (mAh/ g) | 5 C/ 4.48 V (mAh/ g) |
|---|---|---|---|---|---|---|---|
| Example 1 | 0.21 | 0.45 | 0.86 | 210.2 | 202.5 | 188.7 | 161.5 |
| Example 2 | 0.18 | 0.56 | 0.92 | 210.1 | 201.4 | 188.4 | 162.2 |
| Example 3 | 0.32 | 0.60 | 0.95 | 210.5 | 201.9 | 189.0 | 162.7 |
| Comparative Example 1 | 3.43 | 5.82 | 8.76 | 209.0 | 197.2 | 176.4 | 136.2 |
| Comparative Example 2 | 4.02 | 6.21 | 8.93 | 208.9 | 197.0 | 176.2 | 138.5 |

It can be seen from Table 1 that the median particle size of the materials of Comparative Example 1-2 is about 6 µm, and the particle sizes of the materials of Examples 1-3 are all below 1 um, reaching the nanometer level, which is much smaller than that of the Comparative Example. The first discharge specific capacity of the example is not much different from the comparison under the low rate (0.1C), but is significantly higher than the comparison under the high rate (2C, 5C).

Figure 2:
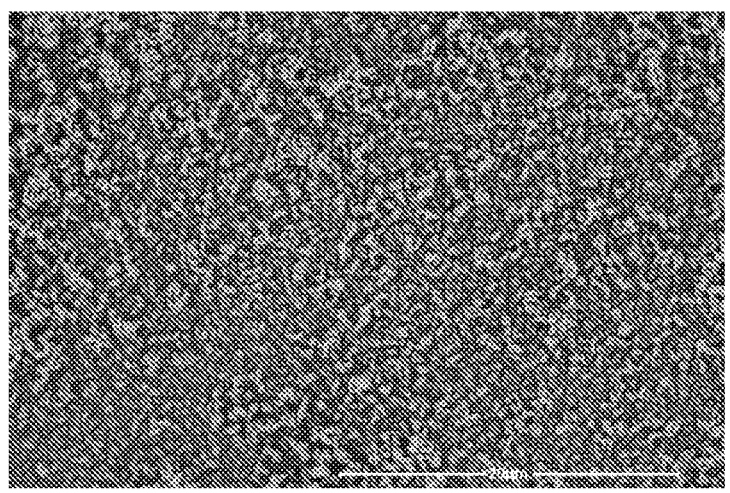
FIG. 2 is an SEM image of the nano-$Co_3O_4$ precursor in Example 1 of the present invention.
Figure 3:
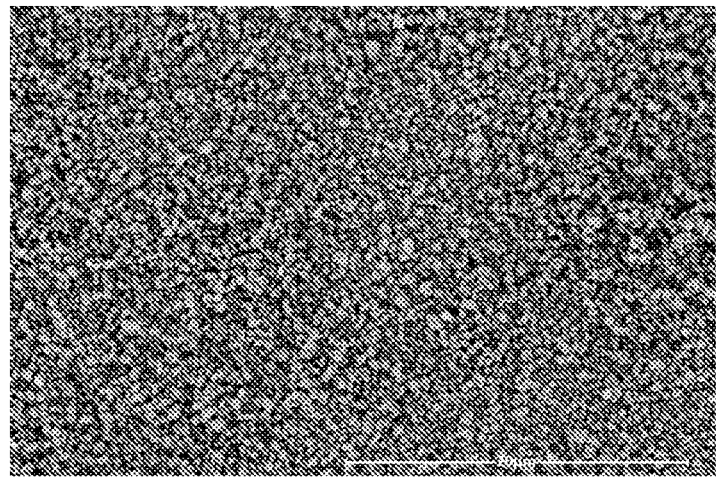
FIG. 3 is an SEM image of the nanosized lithium cobalt oxide cathode material in Example 1 of the present invention.
Figure 4:
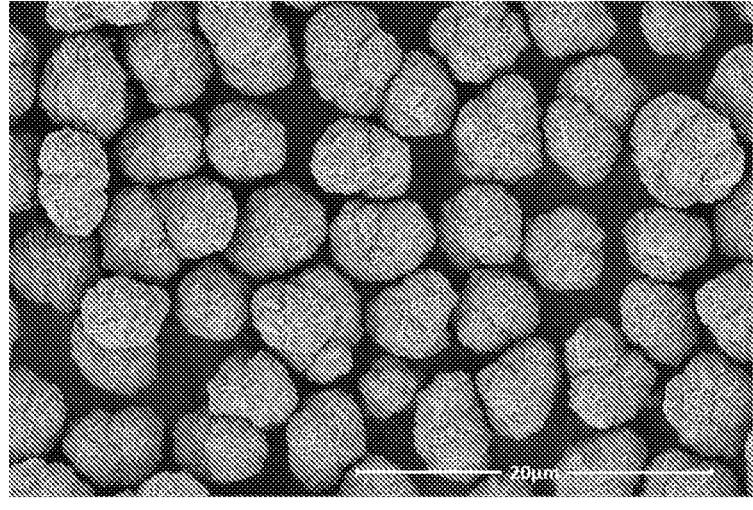
FIG. 4 is an SEM image of the cobalt carbonate powder in Comparative Example 1 of the present invention.
Figure 5:
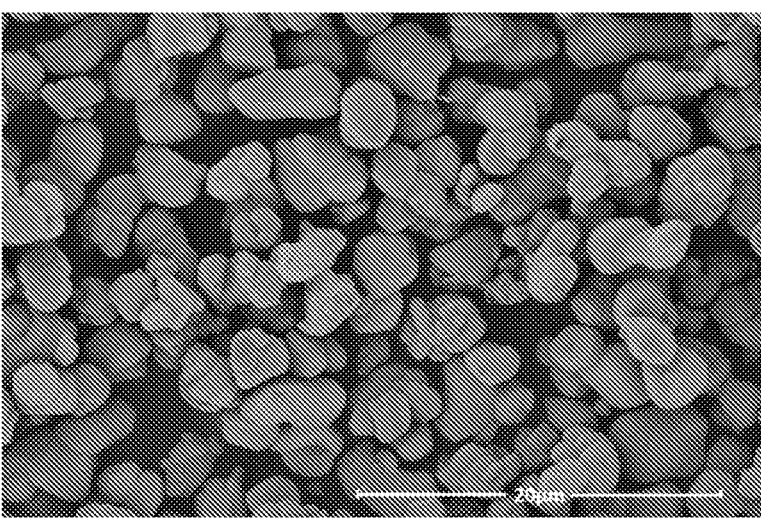
FIG. 5 is an SEM image of lithium cobalt oxide in Comparative Example 1 of the present invention.

FIG. 1 is an SEM picture of the nano-$CoCO_3$ powder of Example 1. It can be seen from the figure that the particles have a uniform short rod-like morphology, and the particle size is below 1 $\mu$m. FIG. 2 is an SEM picture of the nano-$Co_3O_4$ precursor in Example 1. It can be seen from the figure that the morphology of the precursor basically inherits the morphology of the $CoCO_3$ powder and still maintains the nano-short rod shape. FIG. 3 is an SEM picture of the nanosized lithium cobalt oxide of Example 1. It can be seen from the figure that the particles are in the form of dispersed particles, and the particle size is all less than 1 $\mu$m. FIG. 4 is a SEM picture of the cobalt carbonate powder in Comparative Example 1. It can be seen from the figure that the prepared cobalt carbonate particles are spherical with a particle size of about 6 $\mu$m. FIG. 5 is an SEM picture of lithium cobalt oxide in Comparative Example 1. It can be seen from the figure that the lithium cobalt oxide particles prepared in Comparative Example 1 have a granular morphology with a smooth surface and a particle size of about 4-8 $\mu$m. It can be seen that nanosized lithium cobalt oxide particles with uniform particle size, good dispersibility, and no agglomeration can be obtained by means of the preparation method of the present invention.

The examples of the present invention are described in detail above with reference to the accompanying drawings. However, the present invention is not limited to the above-mentioned examples. Within the scope of knowledge possessed by those of ordinary skill in the art, various modifications can be made without departing from the purpose of the present invention. In addition, in the case of no conflict, the examples of the present invention and the features in the examples can be combined with each other.

The invention claimed is:

1. A preparation method for a nanosized lithium cobalt oxide cathode material, consisting of the following steps:

(1) mixing a carbonate solution with a dispersant, adding a cobalt salt solution to perform a reaction, then aging, filtering to obtain a filter residue, drying the filter residue to obtain a nano-$CoCO_3$ powder, and then calcinating the nano-$CoCO_3$ powder to obtain a $Co_3O_4$ precursor;

(2) mixing the $Co_3O_4$ precursor with a lithium salt, and subjecting a resulting mixture to calcinating, cooling, pulverizing and sieving to obtain the nanosized lithtum cobalt oxide cathode material;

wherein a total molar amount of $Co^{2+}$ in the cobalt salt solution is no more than $\frac{1}{5}$ of a total molar amount of carbonate in the carbonate solution;

in step (1), the dispersant is one or more selected from the group consisting of methanol, ethanol, ethylene glycol, propanol and glycerol;

in step (2), the calcinating is carried out at a temperature of 900-1200° C. for 6-18 h.

2. The preparation method according to claim 1, wherein in step (1), the cobalt salt solution is prepared by dissolving a cobalt salt in water, and the cobalt salt is one or more selected from the group consisting of cobalt sulfate, cobalt nitrate and cobalt chloride; a concentration of the cobalt salt solution is 0.1-2.0 mol/L.

3. The preparation method according to claim 1, wherein in step (1), the carbonate solution is prepared by dissolving a carbonate salt in water, and the carbonate salt is one or more selected from the group consisting of sodium carbonate, sodium bicarbonate, ammonium carbonate, ammonium bicarbonate, potassium carbonate and potassium bicarbonate; a concentration of the carbonate solution is 1.0-2.0 mol/L.

4. The preparation method according to claim 1, wherein in step (1), the total molar amount of $Co^{2+}$ in the cobalt salt solution is no more than $\frac{1}{10}$ of the total molar amount of carbonate in the carbonate solution.

5. The preparation method according to claim 1, wherein in step (1), the reaction is carried out at a temperature of 0-70° C.

6. The preparation method according to claim 1, wherein in step (1), the calcinating is carried out at a temperature of 300-800° C.

7. The preparation method according to claim 1, wherein in step (2), the lithium salt is one or more selected from the group consisting of lithium carbonate, lithium nitrate, lithium sulfate and lithium oxalate.

* * * * *